Sept. 11, 1928.
B. J. BERG
1,684,304
COOLING AND FIRE PREVENTION APPARATUS FOR MOTION-PICTURE PROJECTORS
Filed Sept. 2, 1927
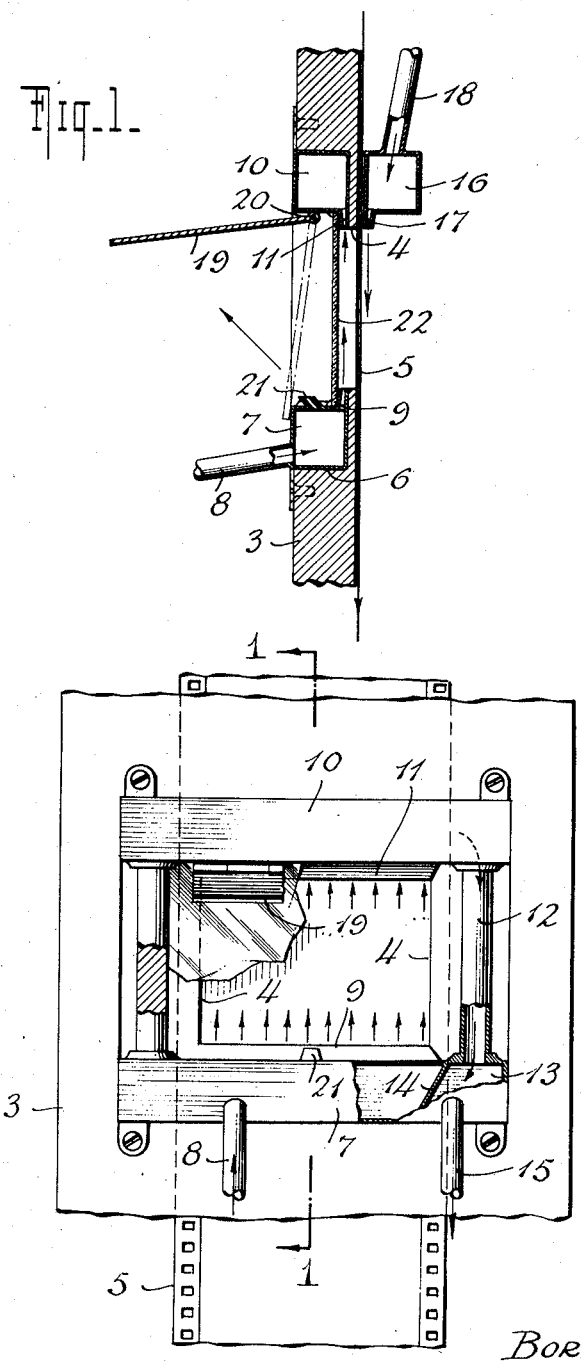
INVENTOR
BORIS J. BERG
BY
ATTORNEYS Patented Sept. 11, 1928.

1,684,304

UNITED STATES PATENT OFFICE.

BORIS J. BERG, OF NEW YORK, N. Y.

COOLING AND FIRE-PREVENTION APPARATUS FOR MOTION-PICTURE PROJECTORS.

Application filed September 2, 1927. Serial No. 217,034.

This invention relates to improvements in motion picture projectors, and has particular reference to a film cooling and fire prevention apparatus therefor.

In the use of projectors for motion pictures it is well known that the rays of light, which are emitted from the incandescent or carbon lamps employed in said apparatus, are extremely hot at their points of concentration in the projector aperture where the film passes at a considerable speed. Should this speed be decreased materially or the film break, due to defects therein or in the operating mechanism, the portion of the film exposed to said rays of light would be damaged by the heat or probably be ignited, resulting in complete destruction of the film and damage to the apparatus. Since the development and use of a low intensity mirror arc lamp in projectors, the heat generated at the film aperture has materially increased, producing an unfavorable condition, which, at the highest possible speed of the film, has had a tendency to blister the film and cause it to buckle.

An object of the present invention is to cool the film by directing a current of air across the film aperture on one or both sides of the film and in parallel relation thereto, whereby the film will not bulge under the influence of said current and can be passed therethrough at a slower speed than heretofore known without showing any traces of heat destruction.

Another object is to arrange a blower and suction device on opposite sides of the film aperture and to operate said device in such manner that the current of air projected across said aperture from the blower will be drawn into the device at a considerably higher rate than that of its ejection from the blower.

A further object is to interpose between the source of light and the film a transparent partition which combines with the film to form a chamber through which the cooling current of air is passed in parallel relation to the film.

A still further object is to create two distinct currents of air on opposite sides of the film and flowing in opposite directions so that the film will pass through a zone of cooling air, and to dispose on one side of said film a suction device which will cooperate with one of the blowers to maintain the direction of the flow therefrom in parallel relation to the film across the entire surface thereof exposed in the film aperture.

Still another object is to deflect a portion of the current of air from a blower and direct the same against a fire shutter located between the source of light and the film so as to move said shutter to open position and maintain the same in such position until the continuous pressure of said air is interrupted or decreased to such an extent as to be insufficient to keep the shutter in its open position.

The above and other objects will appear more clearly from the following detail description, when taken in connection with the accompanying drawing, which illustrates a preferred embodiment of the inventive idea.

In the drawing—

Figure 1 is a fragmentary vertical section through the film trap of a projector and taken substantially on the line 1—1 of Figure 2; and Figure 2 is a fragmentary elevation looking from the interior of the projector, parts being broken away and shown in section.

The invention is illustrated in connection with a conventional form of projecting apparatus which includes the usual film trap 3 having the aperture 4 therein past which the film 5 is moved at the desired speed while the rays from a source of light within the projector are concentrated at the aperture.

The cooling apparatus, which includes the essential features of the invention, is shown in its preferred form as consisting of a substantially rectangular frame mounted within a recess 6 in the inner face of the trap 3. This frame includes a blower chamber 7 which extends along the lower edge of the aperture 4 and which is connected, through a pipe 8, with an air compressor of any suitable design operable to inject compressed air into the chamber 7. For a major portion of the length of the chamber 7 the same is provided with a nozzle 9 the length of which is about equal to the length of the aperture 4. The nozzle 9 is spaced a slight distance inwardly from the film 5 and is so arranged that the current of air passing outwardly through the nozzle will be projected in an upward direction and in a path which is parallel to the film 5 so that said air will have no tendency to bulge the film outwardly while travelling in the opposite direction across the aperture.

The upper portion of the frame is formed by a suction chamber 10 which extends across the upper edge of the aperture 4 and which is provided with a downwardly projecting inlet nozzle 11 disposed in the same vertical plane with the nozzle 9. The chamber 10 is connected by a pipe 12 with the compartment 13 formed in one end of the chamber 7 by means of a partition 14 and this compartment is in turn connected to an outlet pipe 15 joined to a suitable suction apparatus which is capable of producing a suction force greatly in excess of the pressure of the air ejected through the nozzle 9 from the blower chamber 7. By providing a strong suction the rate of flow of the current of air passing upwardly across the aperture 4 is increased as it approaches the suction chamber and any possibility of the air becoming compressed in the film aperture is thereby avoided and the film is kept sufficiently cool by said current of air to prevent any damage to the film which might otherwise be caused by the heat from the source of light of the projector. With an apparatus such as described, experiments have been conducted with high intensity lamps of 140 amperes capacity and it has been found that the film can remain stationary for several hours under the influence of the light rays without damaging the same.

It is also contemplated that another blower, similar to the blower 7, may be provided and in this instance such a blower would be in the form of a chamber 16 arranged along the upper edge of the aperture 4 but on the side of the film opposite to that on which the chamber 7 is disposed. The chamber 16 is also provided with the downwardly projecting nozzle 17 which operates to direct a current of air in a downward direction paralleling the film 5 so that the latter would pass between two air currents on opposite sides thereof. The blower chamber 16 is connected by the pipe 18 to the compressor which also furnishes compressed air for the blower chamber 7. Satisfactory results may also be obtained by dispensing with the suction device 10 when the two blowers 7 and 16 are arranged as described.

There is further provided a fire shutter 19 pivoted at 20 to the suction chamber 10 and movable by gravity to its closing position, indicated in dotted lines in Figure 1, where it is interposed between the film 5 and the source of light of the projector. In order to maintain the shutter 19 in its open position while the film 5 is being shown, the blower chamber 7 is provided with an outlet 21 through which a part of the current of air passing through said chamber to the nozzle 9 is diverted and impinged directly against the shutter 19 so that the same is raised to the full line position shown in Figure 1. As long as the current of air is maintained in the blower the shutter will remain in its open position by reason of the pressure of the air passing through the outlet 21, but should the flow of the air cease the shutter would move by gravity to its closing position and thus prevent the rays of light from reaching the film.

The invention also contemplates the provision of a transparent partition 22 supported by the chambers 7 and 10 between the film and the shutter and combining with the film to form a chamber through which the current of air from the chamber 7 passes, thereby aiding in confining said current and consequently increasing the cooling effect thereof. This partition 22 is made of a known type of optical glass which is non-light absorbing and which does not deflect the light rays.

It may also be possible to arrange two blowers on the same side of the film to create two separate currents of air flowing in the different directions and in this case a nozzle of one of the blowers would be slightly offset with respect to the vertical plane of the nozzle of the other blower. In this manner any tendency of the current of air from one blower to diverge from the film as said current approaches the side of the aperture 4 remote from said blower would be compensated for by the current of air from the second blower and the air from the latter blower would in this way maintain the entire exposed surface of the film at an even temperature.

What is claimed is:

1. In a motion picture projector, a device having an aperture past which a film passes, means on one side of said aperture for passing a current of air adjacent the film on the same side thereof as the light source of the projector, suction means for causing said current of air to pass over the entire surface of the film exposed to the light source, whereby a protective layer of air is interposed between the entire surface of the film exposed to the action of the light source thereby to reduce the absorption of heat by the film, and means for passing a current of air on the other side of the film whereby to remove heat absorbed by the film.

2. In a motion picture projector, a device having an aperture past which a film passes, an air chamber at one end of said aperture having means for directing a current of air adjacent the film on the same side thereof as the light source of the projector, a suction chamber at the other end of said aperture for causing said current of air to pass over the entire surface of the film exposed to the light source, whereby a protective layer of air is interposed between the entire surface of the film exposed to the action of the light source thereby to reduce the absorption of heat by the film, and means for passing a current of air on the other side of the film whereby to remove heat absorbed by the film.

3. In a motion picture projector, a film trap having an aperture past which a film passes, means on one side of said aperture for blowing a current of air across said film, suction means for said current of air on the opposite side of said aperture, a shutter for said aperture movable by gravity to closing position, a transparent partition cooperating with said film to form a chamber for said passage of air, and means externally of the chamber for deflecting a portion of said current directly against said shutter to maintain the same in open position.

4. In a motion picture projector, a film trap having an aperture past which a film passes, means on one side of said aperture for blowing a current of air across the film to cool the same, suction means for said current of air on the opposite side of said aperture, a transparent partition cooperating with said film to form a chamber for the passage of air, a shutter mounted externally of said chamber biased to closed position, and means for directing air from the source of the cooling air against said shutter to hold it open.

In testimony whereof I have affixed my signature.

BORIS J. BERG.